US012099421B2

(12) United States Patent
Mahmood et al.

(10) Patent No.: US 12,099,421 B2
(45) Date of Patent: Sep. 24, 2024

(54) IMPLEMENTING AVAILABILITY DOMAIN AWARE REPLICATION POLICIES

(71) Applicant: Nutanix, Inc., San Jose, CA (US)

(72) Inventors: Mohammad Mahmood, Karnataka (IN); Roger Sean Liao, Durham, NC (US)

(73) Assignee: Vista IP Law Group, LLP, San Jose, CA (US)

( * ) Notice: Subject to any disclaimer, the term of this patent is extended or adjusted under 35 U.S.C. 154(b) by 97 days.

(21) Appl. No.: 17/962,010

(22) Filed: Oct. 7, 2022

(65) Prior Publication Data

US 2023/0168981 A1 Jun. 1, 2023

Related U.S. Application Data

(63) Continuation of application No. 16/946,602, filed on Jun. 29, 2020, now Pat. No. 11,467,933, which is a
(Continued)

(51) Int. Cl.
*G06F 11/20* (2006.01)
*G06F 3/06* (2006.01)

(52) U.S. Cl.
CPC ........ *G06F 11/2094* (2013.01); *G06F 3/0619* (2013.01); *G06F 3/064* (2013.01);
(Continued)

(58) Field of Classification Search
CPC ............. G06F 11/2094; G06F 11/1425; G06F 11/008; G06F 3/0619; G06F 3/064;
(Continued)

(56) References Cited

U.S. PATENT DOCUMENTS 6,487,562 B1  11/2002  Mason, Jr. et al.
6,571,314 B1   5/2003  Komachiya et al.
(Continued)

OTHER PUBLICATIONS

Final Office Action for U.S. Appl. No. 16/946,602 dated Jan. 12, 2022.
(Continued)

*Primary Examiner* — Matthew M Kim
*Assistant Examiner* — Matthew N Putaraksa
(74) *Attorney, Agent, or Firm* — Vista IP Law Group, LLP

(57) ABSTRACT

Systems for distributed data storage. A method commences upon accessing a set of data items that describe computing nodes to be organized into a ring topology. The ring topology and distributed data storage policies are characterized by quantitative failure-resilient characteristics such as a replication factor. Various characteristics of the topology serve to bound two or more availability domains of the ring into which the computing nodes can be mapped. A set of quantitative values pertaining to respective quantitative failure-resilient characteristics are used for enumerating candidate ring topologies where the computing nodes are mapped into the availability domains. Using the quantitative failure-resilient characteristics, alternative candidate ring topologies are evaluated so as to determine a configuration score for candidate ring topologies. A candidate ring topology is configured based on a computed configuration score surpassing a threshold score. When a failure event is detected, the ring is reevaluated, remapped, and considered for reconfiguration.

24 Claims, 10 Drawing Sheets

Related U.S. Application Data continuation of application No. 15/230,147, filed on Aug. 5, 2016, now Pat. No. 10,698,780.

(52) U.S. Cl.
CPC .............. *G06F 3/065* (2013.01); *G06F 3/067* (2013.01); *G06F 2201/805* (2013.01)

(58) Field of Classification Search
CPC .... G06F 3/065; G06F 3/067; G06F 2201/805; G06F 2201/82
See application file for complete search history.

(56) References Cited

U.S. PATENT DOCUMENTS

| | | | |
|---|---|---|---|
| 7,320,088 | B1 | 1/2008 | Gawali |
| 7,738,466 | B2 | 6/2010 | Schwan et al. |
| 7,925,624 | B2 | 4/2011 | Vosshall et al. |
| 8,549,518 | B1 | 10/2013 | Aron et al. |
| 8,601,473 | B1 | 12/2013 | Aron et al. |
| 8,850,130 | B1 | 9/2014 | Aron et al. |
| 8,966,027 | B1 | 2/2015 | Brandwine et al. |
| 8,997,097 | B1 | 3/2015 | Aron et al. |
| 9,052,936 | B1 | 6/2015 | Aron et al. |
| 9,256,374 | B1 | 2/2016 | Aron et al. |
| 9,256,475 | B1 | 2/2016 | Aron et al. |
| 9,354,912 | B1 | 5/2016 | Aron et al. |
| 9,389,887 | B1 | 7/2016 | Aron et al. |
| 9,575,784 | B1 | 2/2017 | Aron et al. |
| 9,619,257 | B1 | 4/2017 | Aron et al. |
| 9,635,109 | B2 | 4/2017 | Iliadis et al. |
| 9,772,784 | B2 | 9/2017 | Bhardwaj et al. |
| 9,772,866 | B1 | 9/2017 | Aron et al. |
| 9,817,606 | B1 | 11/2017 | Byrne et al. |
| 10,698,780 | B2 | 6/2020 | Mahmood et al. |
| 2003/0204509 | A1 | 10/2003 | Dinker et al. |
| 2004/0066741 | A1 | 4/2004 | Dinker et al. |
| 2005/0015641 | A1 | 1/2005 | Alur et al. |
| 2007/0006015 | A1 | 1/2007 | Rao et al. |
| 2007/0094343 | A1 | 4/2007 | Sangle et al. |
| 2007/0150558 | A1 | 6/2007 | Teodosiu et al. |
| 2007/0214105 | A1 | 9/2007 | Sfarti et al. |
| 2007/0214255 | A1 | 9/2007 | Spitz et al. |
| 2007/0226224 | A1 | 9/2007 | Wanigasekara-mohotti et al. |
| 2008/0028009 | A1 | 1/2008 | Ngo |
| 2009/0077557 | A1 | 3/2009 | Ichikawa et al. |
| 2009/0327364 | A1 | 12/2009 | Schwan et al. |
| 2010/0003681 | A1 | 1/2010 | Azuma et al. |
| 2011/0231450 | A1 | 9/2011 | Sinha et al. |
| 2013/0163471 | A1 | 6/2013 | Indukuri et al. |
| 2014/0075002 | A1 | 3/2014 | Pradhan et al. |
| 2015/0199206 | A1* | 7/2015 | Chang .................. G06F 3/0647 718/1 |
| 2016/0191391 | A1 | 6/2016 | Wood et al. |
| 2016/0232061 | A1 | 8/2016 | Gaschler et al. |
| 2017/0013058 | A1 | 1/2017 | Annamalai et al. |
| 2017/0132089 | A1 | 5/2017 | Roehrsheim et al. |
| 2017/0147227 | A1 | 5/2017 | Stabrawa et al. |
| 2017/0317780 | A1 | 11/2017 | Wood et al. |
| 2018/0121295 | A1 | 5/2018 | Ramamurthi et al. |
| 2019/0155613 | A1 | 5/2019 | Olderdissen et al. |
| 2019/0278483 | A1 | 9/2019 | Mahmood et al. |
| 2019/0322495 | A1 | 10/2019 | Prager |
| 2020/0019514 | A1 | 1/2020 | Desai |
| 2020/0026446 | A1 | 1/2020 | Jawahar et al. |
| 2020/0099692 | A1* | 3/2020 | Jindal ................. G06F 11/1438 |
| 2021/0089662 | A1* | 3/2021 | Muniswamy-Reddy .................... H04L 63/166 |
| 2021/0271489 | A1* | 9/2021 | Singhal ..................... G06F 8/63 |
| 2022/0319219 | A1* | 10/2022 | Tsibulevskiy ........ G06V 30/226 |
| 2022/0329481 | A1* | 10/2022 | Nelson ................. G06F 3/0604 |

OTHER PUBLICATIONS

Non-Final Office Action for U.S. Appl. No. 16/946,602 dated Sep. 20, 2021.
Notice of Allowance for U.S. Appl. No. 16/946,602 dated May 19, 2022.
Wikipedia, "Replication (computing)", Mar. 28, 2016, 8 pages.
Featherston, D., "Cassandra: Principles and Application", University of Illinois at Urbana-Champaign, May 2010, 17 pages.
Lakshman et al., "Cassandra—A Decentralized Structured Storage System", Jan. 2008, 6 pages.
Ex-Parte Quayle Action dated Mar. 28, 2018 for related U.S. Appl. No. 15/230,147.
Notice of Allowance dated Aug. 3, 2018 for related U.S. Appl. No. 15/230,147, 5 pages.
Notice of Allowance dated Mar. 25, 2019 for related U.S. Appl. No. 15/230,147, 7 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
VPSA Object Storage: "Introduction" (Jun. 6, 2019), Zadara Guides, Version: 18.07, from http://guides.zadarastorage.com/zios-guide/1807/introduction.html.
Openstack: "The Rings" (Updated on Jun. 3, 2019), from https://docs.openstack.org/swift/latest/overview_ring.html.
Mills, A. "Algorithms for Optimal Replica Placement Under Correlated Failure in Hierarchical Failure Domains" (Apr. 21, 2017), the University of Texas at Dallas.
Rbiswas. "Rack Awareness—Hortonworks" (Jul. 2, 2016), from https://community.hortonworks.com/articles/43057/rack-awareness-1.html.
"Virtuozzo Storage: Administrator's Command Line Guide" (Apr. 24, 2019), https://docs.virtuozzo.com/pdf/virtuozzo_storage_administrators_command_line_guide.pdf.
Non-Final Office Action dated Jul. 8, 2019 for related U.S. Appl. No. 15/230,147.
Notice of Allowance dated Aug. 27, 2019 for related U.S. Appl. No. 15/818,660.
Cano, I. et al., "Curator: Self-Managing Storage for Enterprise Clusters", 14th USENIX Symposium on Networked Systems Design and Implementation, NSDI '17, (Mar. 27, 2017).
Final Office Action dated Nov. 20, 2019 for related U.S. Appl. No. 15/230,147.
Notice of Allowance dated Jan. 31, 2020 for related U.S. Appl. No. 15/818,660.

(56) References Cited

OTHER PUBLICATIONS

Notice of Allowance dated Feb. 26, 2020 for related U.S. Appl. No. 15/230,147.
Notice of Allowance dated Jun. 8, 2020 for related U.S. Appl. No. 16/425,022.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Poitras, Steven. "The Nutanix Bible" (Sep. 9, 2022), from https://nutanixbible.com/ (Publication date based on indicated capture date by Archive.org; first publication date unknown).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Chaubal, C., "Introducing vSphere 6.5," VMWare vSphere Blog, dated Oct. 18, 2016.
Lam, W., "All replicated Platform Services Controller should be joined to Active Directory," WilliamLam.com, dated Jun. 16, 2015.
Walat, T., "VMware Platform Services Controller (PSC)," VMWare, dated May 2015.
Johnson, R., "Reconfiguring and Repointing Deployment Models in vCenterServer 6.0 Update 1," VMWare vSphere Blog, dated Oct. 1, 2015.
Griffiths, J., "Setting up replication on the platform services controller," Joseph Griffiths Random thoughts and technical bits, dated Feb. 28, 2017.
Johnson, R., "Updating vCenter Server Appliance6.0 to Update 1," VMWare vSphere Blog, dated Sep. 28, 2015.
"Vdcrepadmin to find the replication status and design the Platform Services Controller 6.0", Techbrainblog, dated Oct. 31, 2016.
"What's New in the VMware vSphere® 6.0 Platform: Version 1.1 / Technical White Paper," VMWare, dated Mar. 2015.
"vSphere Resource Management: Update 1—VMware vSphere 6.0—VMware ESXi 6.0—vCenter Server 6.0," VMWare, copyright 2015.
"Setup for Failover Clustering and Microsoft Cluster Service: Update 1—VMware vSphere 6.0—VMware ESXi 6.0—vCenter Server 6.0," VMWare, copyright 2016.
"Administering VMware Virtual SAN," VMWare, dated Feb. 21, 2019.
"vSphere Administration with the vSphere Client," VMWare, dated Aug. 13, 2020.
"vCenter Server Appliance Configuration: Update 1," VMWare, copyright 2017.
"vSphere Availability: Update 1, Modified," VMWare, dated Aug. 13, 2020.
"vSphere Host Profiles: Update 1," VMWare, copyright 2017.
"vSphere Monitoring and Performance: Update 1," VMWare, copyright 2017.
"vSphere Storage," VMWare, dated Apr. 19, 2022.
"vSphere Troubleshooting: Update 1," VMWare, copyright 2017.
"vSphere Virtual Machine Administration," VMWare, dated Jun. 11, 2021.
"vCenter Server and Host Management: Update 2," VMWare, dated Apr. 1, 2021.
"vSphere Installation and Setup: Update 2," VMWare, dated Aug. 11, 2022.
"vSphere Networking: Update 2," VMWare, copyright 2018.
"vSphere Security: Update 2," VMware, dated Apr. 27, 2022.
"vSphere Upgrade: Update 2," VMWare, dated Aug. 11, 2020.
"vSphere Single Host Management - VMware Host Client: Update 2," VMWare, dated Apr. 2, 2021.
"Reconfiguring VMware vSphere Update Manager," VMWare, copyright 2017.
"Installing and Administering VMware vSphere Update Manager: Update 1," VMWare, dated Aug. 13, 2020.
"vSphere Migration: Update 2," VMWare, copyright 2020.
"vCenter Server Appliance Configuration vCenter Server 6.5," VMWare, copyright 2017.
"vSphere Availability," VMWare, copyright 2017.
"vCenter Server and Host Management," VMWare, Copyright 2017.
"vSphere Host Profiles," VMWare, Copyright 2016.
"vSphere Installation and Setup," VMWare, copyright 2017.
"vSphere Monitoring and Performance," VMWare, copyright 2017.
"vSphere Networking," VMWare, copyright 2017.
"Platform Services Controller Administration," VMWare, copyright 2017.
"vSphere Resource Management," VMWare, copyright 2016.
"vSphere Security," VMWare, copyright 2017.
"vSphere Storage," VMWare, copyright 2017.
"vSphere Troubleshooting," VMWare, copyright 2016.
"vSphere Upgrade," VMWare, copyright 2017.
"vSphere Virtual Machine Administration," VMWare, copyright 2017.
"vSphere Single Host Management—VMware Host Client," VMWare, copyright 2017.

* cited by examiner

IMPLEMENTING AVAILABILITY DOMAIN AWARE REPLICATION POLICIES

CROSS REFERENCE TO RELATED APPLICATION(S)

This application is a continuation of U.S. patent application Ser. No. 16/946,602 entitled "IMPLEMENTING AVAILABILITY DOMAIN AWARE REPLICATION POLICIES" and filed on Jun. 29, 2020. The content of the aforementioned U.S. patent application is hereby expressly incorporated by reference in its entirety for all purposes. This application is also a continuation of U.S. patent application Ser. No. 15/230,147 entitled "IMPLEMENTING AVAILABILITY DOMAIN AWARE REPLICATION POLICIES" and filed on Aug. 5, 2016. The content of the aforementioned U.S. patent application is hereby expressly incorporated by reference in its entirety for all purposes.

FIELD

This disclosure relates to distributed data storage, and more particularly to techniques for efficiently implementing availability domain aware replication policies in distributed storage platforms.

BACKGROUND

The use of virtual machines (VMs) to improve the use of computing resources continues to increase. Such VMs can be characterized as software-based computing "machines" implemented in a virtualization environment comprising various hardware resources (e.g., CPU, memory, etc.). The VMs can operate based at least in part on the computer architecture and/or functions (e.g., operating system) of a real or hypothetical computer. Multiple VMs can operate on one physical machine (e.g., computer), with each VM sharing the resources of that physical computer across multiple environments. Various VMs can run multiple operating systems and/or multiple applications on the physical computer. Such flexibility can be facilitated at least in part by a hypervisor, which hypervisor allocates hardware resources dynamically and transparently.

The high storage I/O demand of VMs has precipitated an increase in distributed storage systems implemented in the virtualization environments. Specifically, such distributed storage systems can aggregate various physical storage facilities to create a logical storage pool throughout which certain data may be efficiently distributed according to various metrics and/or objectives. Metadata describing the storage pool and/or its virtualized representations may be also distributed any number of times among various nodes in the distributed storage system. Users of distributed storage systems have a data consistency expectation (e.g., "strictly consistent") of a distributed storage platform to provide consistent and predictable storage behavior (e.g., availability, accuracy, etc.) for data and/or metadata. Distributed storage platforms can address such expectations by implementing a replication policy to facilitate data redundancy and/or availability in case of a node and/or a disk failure. For example, a given replication policy might be described at least in part by a numeric replication factor (RF) such as "RF=3", indicating that three replicas of certain data (e.g., metadata, user data, etc.) may be distributed among various available nodes in the network topology.

Unfortunately, legacy techniques for implementing replication policies in distributed storage platforms can be limited at least in their ability to be aware of availability domains. A replication policy implementation that is availability domain aware, also referred to as block aware or rack aware, is one that remains compliant upon failure of any one availability domain, which availability domain might be defined by a boundary that includes a certain set of physical and/or virtual components (e.g., one or more nodes, blocks, hosts, sites, appliances, racks, data centers, etc.). If the replication policy is violated upon failure of the availability domain, the implementation is availability domain unaware or block unaware. For example, if an RF of three (e.g., RF=3) is specified for a given replication policy and an availability domain failure results in two of the three replication nodes to fail, the replication policy will be violated.

Some legacy replication policy implementation techniques, for example, might facilitate selecting the replication nodes randomly or are gnostic to availability domain associations. In such cases, various availability domain failures can precipitate replication policy violations. The frequency of such violations can increase as the number of nodes and/or the RF increases. Other legacy techniques might decrease the RF in the replication policy at the risk of data inconsistency and/or data loss. Further, more availability domains (e.g., hardware appliances, hosts, racks, sites, data centers, etc.) might be added to reduce replication policy violations, imposing a significant hardware, facility, and/or implementation expense. For highly scalable and active distributed computing and storage systems having dynamic node topologies (e.g., node count, node allocation, etc.), the foregoing legacy techniques can be limited at least as pertains to ongoing maintenance of compliance to an availability domain aware replication policy.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for efficiently implementing availability domain aware replication policies in distributed storage platforms, which techniques advance the relevant technologies to address technological issues with legacy approaches. More specifically, the present disclosure provides a detailed description of techniques used in systems, methods, and in computer program products for efficiently implementing availability domain aware replication policies in distributed storage platforms. Certain embodiments are directed to technological solutions for implementing a heuristics-based informed search technique to efficiently select an availability domain aware replication configuration.

The disclosed embodiments modify and improve over legacy approaches. In particular, the herein-disclosed techniques provide technical solutions that address the technical problems attendant to implementing replication policies in distributed storage platforms that observe availability domain boundaries. Such technical solutions serve to reduce the demand for computer memory, reduce the demand for computer processing power, reduce network bandwidth use, and reduce the demand for inter-component communication.

Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-availability computing as well as advances in various technical fields related to data storage.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
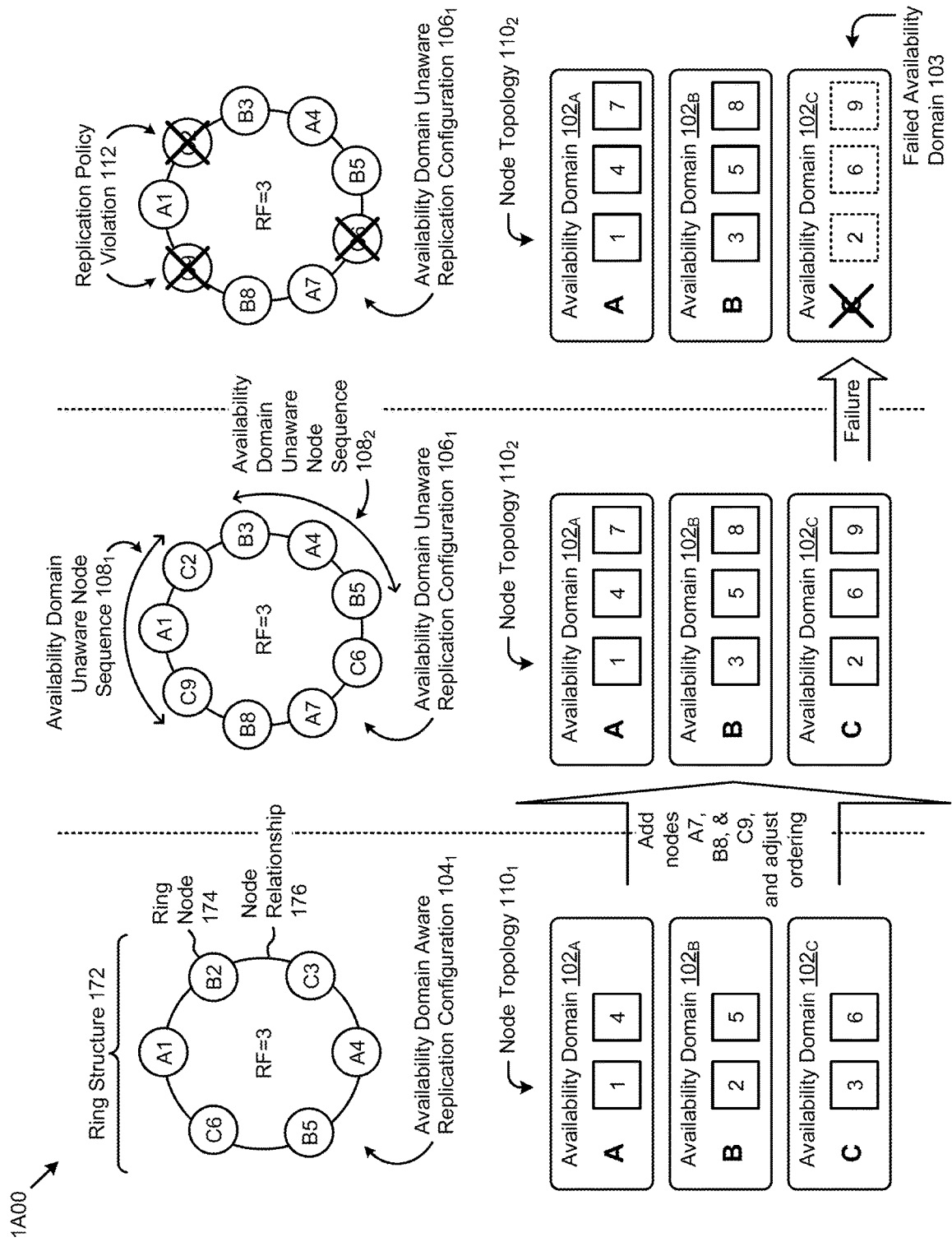
FIG. 1A illustrates an availability domain unaware replication scenario.

Some embodiments of the present disclosure address the problem of implementing replication policies in distributed storage platforms that observe availability domain boundaries and some embodiments are directed to approaches for implementing a heuristics-based informed search technique to efficiently select an availability domain aware replication configuration. The accompanying figures and discussions herein present example environments, systems, methods, and computer program products for efficiently implementing availability domain aware replication policies in distributed storage platforms.

Overview

Disclosed herein are techniques for implementing a heuristics-based informed search technique to efficiently select an availability domain aware replication configuration. In certain embodiments, a replication configurator implemented in a distributed storage platform can monitor a current replication configuration to determine an availability domain aware status. If the current replication configuration is availability domain unaware, the replication configurator can determine a set of possible replication configurations for the given environment. In some embodiments, some of the possible replication configurations can be constrained. For example, some of the possible replication configurations comprising nodes in a ring arrangement might have merely one node in the ring arrangement that has a position that has changed in comparison to the current replication configuration and/or a neighboring replication configuration. A transition score can be determined for the possible replication configurations to facilitate selection of an availability domain aware replication configuration. In certain embodiments, the transition score can be based at least in part on a heuristic function derived from certain metrics associated with the possible replication configurations. In other embodiments, the selection can be based at least in part on an informed search technique.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A illustrates an availability domain unaware replication scenario 1A00. As an option, one or more variations of availability domain unaware replication scenario 1A00 or any aspect thereof may be implemented in the context of the architecture and functionality of the embodiments described herein. The availability domain unaware replication scenario 1A00 or any aspect thereof may be implemented in any environment.

A node topology $110_1$ shown in FIG. 1A might comprise three availability domains (e.g., availability domain $102_A$, availability domain $102_B$, and availability domain $102_C$) in a highly scalable distributed storage platform. An availability domain (e.g., a fault domain), can be a set of hardware components (e.g., computers, switches, etc.) that share a single point of failure. As an example, an availability domain might be bounded by a physical server or a rack of servers. In some cases, the availability domain might be a portion of a server rack, where merely certain support components (e.g., redundant power supply unit, fans, etc.) are shared with other availability domains comprising the server rack. Node topology $110_1$ further indicates various compute and/or storage nodes implemented in each availability domain. Specifically, node 1 and node 4 are in availability domain $102_A$, node 2 and node 5 are in availability domain $102_B$, and node 3 and node 6 are in availability domain 102. A replication policy for the data (e.g., metadata, user data, etc.) pertaining to the nodes comprising node topology $110_1$ might be implemented among the nodes using a replication configuration represented by a ring structure 172 as shown. Specifically, the ring structure 172 represents the node relationships (e.g., node relationship 176) among a set of ring nodes (e.g., ring node 174) from the nodes in node topology $110_1$. As shown, the ring nodes can be represented in notation by "[availability domain identified][node identifier]" (e.g., A1, B2, C3, etc.). A replication service can use the ring-like replication configuration to implement the replication policy. For a replication policy having a replication factor of three (e.g., RF=3), data replications for a subject ring node will be performed on the two ring nodes that are one position and two positions (e.g., traversing clockwise) from the subject ring node. For example, data from ring node A1 will be replicated on ring node B2 and ring node C3. In some cases, the direction that replicas are placed on the ring structure is based at least in part on an increasing token order.

In some cases, a majority of ring nodes (e.g., a quorum) related to a given replication are to agree on the consistency of the replicated data before the replication is committed. This ensures strict consistency for all stored data and/or metadata. The quorum number (e.g., QN) also establishes a minimum number of replication copies that need to be available at a given moment in time, such as after a node and/or availability domain failure. For example, a replication factor of three (e.g., RF=3) corresponds to a quorum number of two (e.g., QN=2), such that an availability domain failure can render merely one of the three copies unavailable. When the number of copies available after an availability domain failure is greater than or equal to the quorum number, the replication configuration is "availability domain aware". When the number of copies available after an availability domain failure is less than the quorum number, the replication configuration is "availability domain unaware". Of course, the arithmetic semantics pertaining to surpassing a threshold value (e.g., higher or lower) and/or corresponding comparison techniques (e.g., greater than or lower than) can be defined using any known technique.

As shown, the replication configuration for node topology $110_1$ shown in FIG. 1A is an availability domain aware replication configuration $104_1$. As further shown, certain system scaling operations might result in a modified instance of a node topology $110_2$. Specifically, three nodes (e.g., node 7, node 8, and node 9) might be added to the availability domains. It is possible that as newly-added nodes are included in the replication configuration, an availability domain unaware replication configuration $106_1$ might be generated. In this case, one or more availability domain unaware node sequences (e.g., availability domain unaware node sequences $108_1$ and availability domain unaware node sequences $108_2$) might be included in the ring structure. Such availability domain unaware node sequences comprise ring nodes from a given availability domain that are positioned such that a failure in an availability domain would violate a replication policy. For example, ring node C9 and ring node C2 in availability domain unaware node sequences $108_1$, and ring node B3 and ring node B5 in the availability domain unaware node sequences $108_2$ can precipitate a replication policy violation (e.g., when RF=3) upon failure of availability domain $102_C$ or availability domain $102_B$, respectively. As shown in FIG. 1A, when the availability domain $102_C$ is the failed availability domain 103, ring node C2, ring node C6, and ring node C9 are rendered unavailable, resulting in a replication policy violation 112.

The herein disclosed techniques can address such issues attendant to implementing replication policies in highly scalable distributed storage platforms that observe availability domain boundaries. Such techniques are shown and described as pertains to FIG. 1B.

Figure 1B:
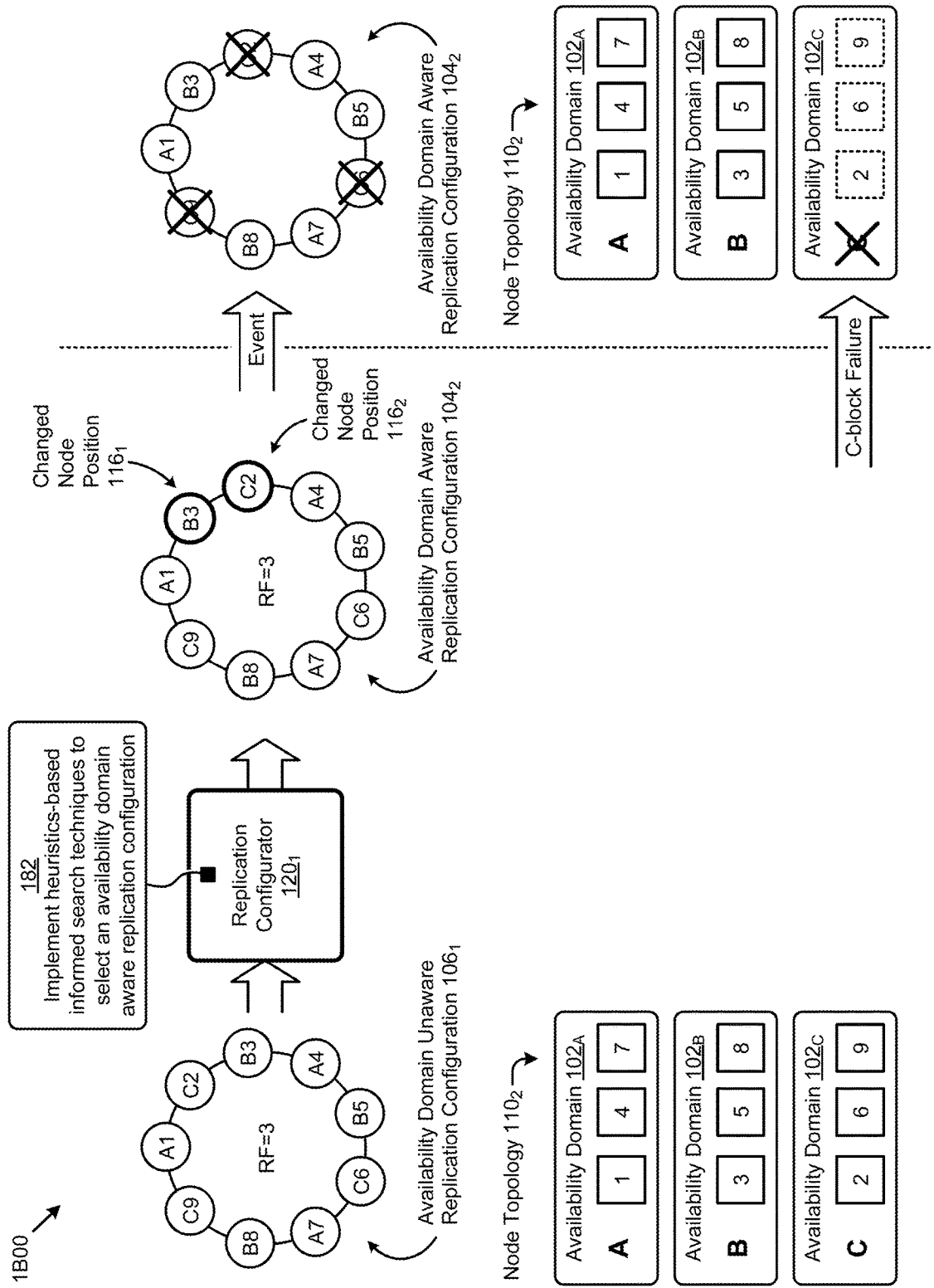
FIG. 1B illustrates an availability domain aware replication scenario facilitated by systems that efficiently implement availability domain aware replication policies in distributed storage platforms, according to an embodiment.

FIG. 1B illustrates an availability domain aware replication scenario 1B00 facilitated by systems that efficiently implement availability domain aware replication policies in distributed storage platforms. As an option, one or more variations of availability domain aware replication scenario 1B00 or any aspect thereof may be implemented in the context of the architecture and functionality of the embodiments described herein. The availability domain aware replication scenario 1B00 or any aspect thereof may be implemented in any environment.

As earlier described in FIG. 1A, certain scaling operations in a distributed storage platform might result in a node topology $110_2$ having an associated instance of an availability domain unaware replication configuration $106_1$. In this case, a replication configurator $120_1$ implemented according to the herein disclosed techniques can apply certain heuristics-based informed search techniques to efficiently select an availability domain aware replication configuration (at operation 182). Specifically, as shown, such techniques might generate an availability domain aware replication configuration $104_2$. The heuristics-based informed search techniques applied can facilitate selecting an availability domain aware replication configuration (e.g., availability domain aware replication configuration $104_2$) in a manner that is efficient (e.g., minimum computations) and/or optimal. For example, an efficient characteristic of the selection technique might correspond to minimizing the number of computations associated with selecting availability domain aware replication configuration $104_2$. An optimal characteristic of the selection technique might correspond to minimizing the number of changed node positions associated with selecting availability domain aware replication configuration $104_2$. As an example, the availability domain aware replication configuration $104_2$ differs from the availability domain unaware replication configuration $106_1$ by two changed node positions (e.g., changed node position $116_1$ and changed node position $116_2$).

With the availability domain aware replication configuration $104_2$ generated by the herein disclosed techniques, the replication configuration can facilitate a replication policy compliance upon failure of the availability domain $102_C$ (e.g., failed availability domain $103$). One embodiment depicting an implementation of such techniques is shown and described as pertaining to FIG. 1C.

Figure 1C:
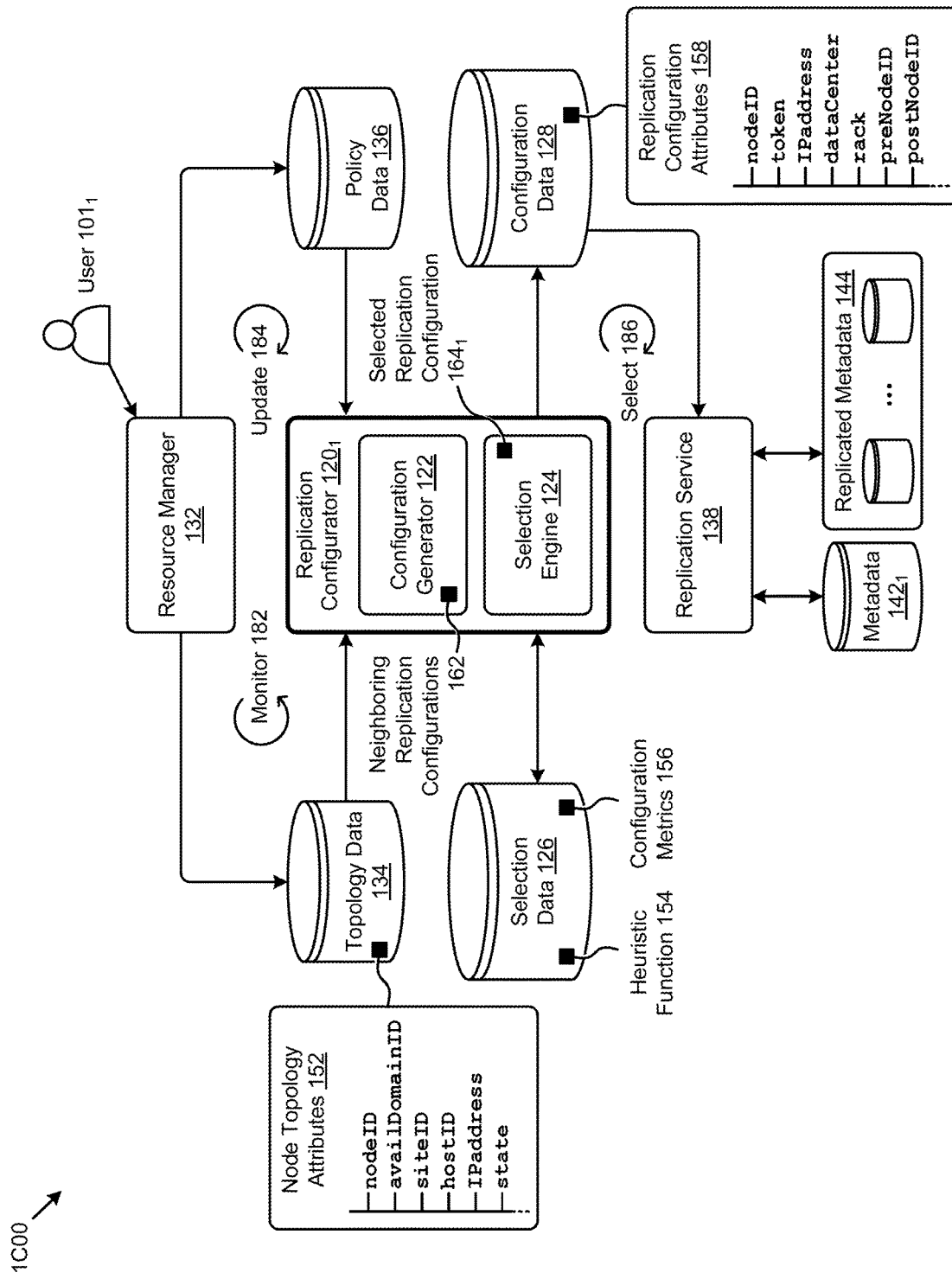
FIG. 1C depicts implementation techniques as used when implementing availability domain aware replication policies in distributed storage platforms, according to an embodiment.

FIG. 1C depicts implementation techniques 1C00 as used when implementing availability domain aware replication policies in distributed storage platforms. As an option, one or more variations of implementation techniques 1C00 or any aspect thereof may be implemented in the context of the architecture and functionality of the embodiments described herein. The implementation techniques 1C00 or any aspect thereof may be implemented in any environment.

As shown in FIG. 1C, the replication configurator $120_1$ earlier described can interact with various components in a distributed storage platform to implement the herein disclosed techniques. Specifically, the replication configurator $120_1$ might interact with various data provided by resource manager 132. In some cases, instances of the resource manager 132 might run on one or more nodes in a cluster with an elected leader instance. Resource manager 132 can provide certain instances of topology data 134 and/or instances of policy data 136 to the replication configurator $120_1$. Specifically, the resource manager 132 can continually monitor (at operation 182) the nodes in the cluster to detect changes to the node topology such as added nodes, remove nodes, failed nodes, and/or other node topology characteristics. In some cases, a "snitch" service can provide information about the node topology.

Information about the then-current node topology can be codified in topology data 134 at least in part as a set of node topology attributes 152. For example, the node topology attributes 152 can comprise certain attributes corresponding to each node such as a node identifier or nodeID, an availability domain identifier or availDomainID, a site identifier or siteID, a host identifier or hostID, an IP address or IPaddress, a node state or state (e.g., pertaining node health, loading, etc.), and/or other attributes. Resource manager 132 can further continually update (at operation 184) policy data 136 based at least in part on user input (e.g., user $101_1$), an enterprise policy file, and/or other policy data sources. For example, policy data 136 might specify a replication factor (e.g., RF=3), or might specify a preferred site or host or IP address, etc.

When an availability domain unaware replication configuration is detected, a configuration generator 122 at the replication configurator $120_1$ can use any data (e.g., topology data 134, policy data 136, etc.) available to replication configurator $120_1$ to generate one or more instances of neighboring replication configurations 162. A selection engine 124 at replication configurator $120_1$ can select a selected replication configuration $164_1$ that is availability domain aware based at least in part on one or more of neighboring replication configurations 162.

Selection engine 124 can use various instances of selection data 126 to facilitate the selection of the selected replication configuration $164_1$. For example, a set of configuration metrics 156 corresponding to the then-current replication configuration and/or the neighboring replication configurations 162 generated by the configuration generator 122 might be used to determine selected replication configuration $164_1$. For example, the configuration metrics 156 might comprise a configuration score (CS) that is the sum of all the node scores (NS) for each of the ring nodes in the replication configuration, which node scores measure a minimum distance (e.g., number of positions or ring nodes) from a given ring node to the nearest ring node from the same availability domain. The configuration score might also be referred to as a block aware score or a rack aware score. In an availability domain aware replication configuration, the node score for each of the ring nodes in the ring structure is equal to or greater than the replication factor minus one (e.g., NS≥RF−1). A replication configuration can be determined to be availability domain aware when its configuration score is equal to or greater than a configuration score threshold (CST). Specifically, the CST can be defined as, $$CST = N*(RF-1) \qquad (EQ. 1)$$

where:
N=number of nodes, and
RF=replication factor.

Configuration metrics 156 might further include a maximum consecutive node score (MCN) that measures the maximum number of consecutive ring nodes in the replication configuration that are availability domain aware (e.g., NS≥RF−1). In some embodiments, selection engine 124 can also use a heuristic function 154 to facilitate selecting selected replication configuration $164_1$. In certain embodiments, heuristic function 154, configuration metrics 156, and/or other information can be used in combination with an informed search technique to efficiently and/or optimally determine selected replication configuration $164_1$. For example, the informed search technique might be based at least in part on an A* search algorithm, a breadth first search algorithm, a best first search algorithm, a greedy approach, a pruning technique, and/or other techniques and/or combinations thereof.

Selected replication configuration $164_1$ can be stored in a set of configuration data 128 for access by a replication service 138. Specifically, replication service 138 might run on each node in a cluster to manage replication of metadata $142_1$ to a set of replicated metadata 144 distributed throughout the distributed storage platform. Information pertaining to selected replication configuration $164_1$ and/or other replication configurations can be codified in configuration data 128 at least in part as a set of replication configuration attributes 158. For example, replication configuration attributes 158 can comprise certain attributes corresponding to a given replication configuration such as a node identifier or nodeID, a token identifier or token, an IP address or IPaddress, a data center or dataCenter, a rack identifier or rack, a predecessor node identifier or preNodeID, a successor node identifier or postNodeID, and/or other attributes. As an example, the token attribute, the preNodeID attribute, and/or the postNodeID attribute might be used to determine a node relationship. The replication configuration can continually select (at operation 186) a new instance of a selected replication configuration $164_1$ based at least in part on node topology changes (e.g., scaling, policy data changes) and/or other dynamic events.

As earlier described, the herein disclosed techniques can address the problems attendant to implementing replication policies on highly scalable and active distributed computing and storage systems having dynamic node topologies. One embodiment of an environment comprising such a highly dynamic and/or scalable distributed infrastructure is shown and described as pertains to FIG. 2.

Figure 2:
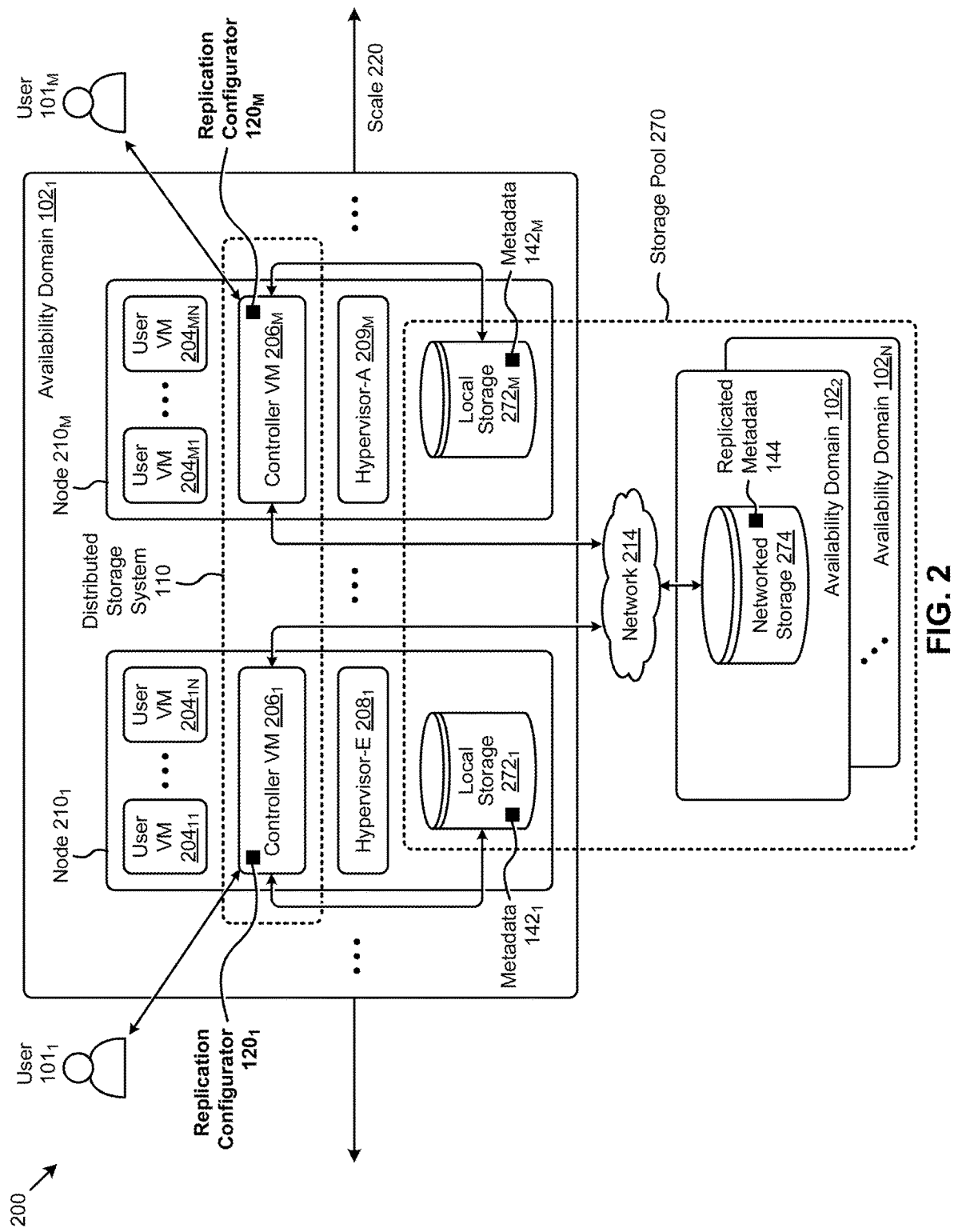
FIG. 2 presents an environment in which embodiments of the present disclosure can operate.

FIG. 2 presents an environment 200 in which embodiments of the present disclosure can operate. As an option, one or more variations of environment 200 or any aspect thereof may be implemented in the context of the architecture and functionality of the embodiments described herein.

The environment 200 shows various components associated with a highly scalable distributed computing and storage system that observes availability domain boundaries. Specifically, the environment 200 depicts one embodiment of a distributed storage system 110 associated with multiple availability domains (e.g., availability domain $102_1$, availability domain $102_2$, . . . , availability domain $102_N$) in which availability domain aware replication policies can be implemented according to the herein disclosed techniques. Specifically, the environment 200 can comprise multiple nodes (e.g., node $210_1$, . . . , node $210_M$) that have multiple tiers of storage in a storage pool 270. For example, each node can be associated with one server, multiple servers, or portions of a server. The multiple tiers of storage can include storage that is accessible through network 214 such as a networked storage 274 (e.g., a SAN or "storage area network"). The storage pool 270 can also comprise one or more instances of local storage (e.g., local storage $272_1$, . . . , local storage $272_M$) that is within or directly attached to a server and/or appliance associated with the nodes. Such local storage can include solid state drives (SSDs), hard disk drives (HDDs), and/or other storage devices.

Each node can run virtualization software (e.g., VMware ESXi, Microsoft Hyper-V, RedHat KVM, Nutanix AHV, etc.) that includes a hypervisor. For example, a hypervisor-E $208_1$ might correspond to VMware ESXi software, and a hypervisor-A $209_M$ might correspond to Nutanix AHV software. Such hypervisors can manage the interactions between the underlying hardware and one or more user VMs (e.g., user VM $204_{11}$, . . . , user VM $204_{1N}$, . . . , user VM $204_{M1}$, . . . , user VM $204_{MN}$) that run client software.

A virtualized controller (e.g., an instance of a virtual machine) can be used to manage storage and I/O activities according to some embodiments. Multiple instances of such virtualized controllers (e.g., controller VM $206_1$, . . . , controller VM $206_M$) coordinate within a cluster to form distributed storage system 110 which can, among other operations, manage the storage pool 270. Controller VMs are not formed as part of specific implementations of the hypervisors. Instead, controller VMs run as virtual machines above the hypervisors on the various servers. Since controller VMs run above the hypervisors, varying virtual machine architectures and/or hypervisors can operate with the distributed storage system 110. This architecture further facilitates efficient scaling of the distributed computing and/or storage platform (e.g., see scale 220).

In one or more embodiments, one or more instances of the replication configuration disclosed herein can be implemented in distributed storage system 110. Specifically, an instance of replication configurator $120_1$ can be implemented in controller VM $206_1$, and another instance of replication configurator $120_M$ can be implemented in controller VM $206_M$. Such instances of the replication configuration can be implemented in any node in any cluster. In some cases, the instances of the management task-scheduling engine on each node can be controlled by an elected leader instance of the replication configurator that manages the replication configurations pertaining to the nodes in a cluster. The metadata replicated according to the replication configurations generated according to the herein disclosed techniques can be stored in local storage (e.g., metadata $142_1$, . . . , metadata $142_M$) and/or networked storage 274 (e.g., replicated metadata 144). In some cases, an interface can be implemented in the controller VMs to facilitate user (e.g., user $101_1$, . . . , user $101_M$) interaction with the replication configurator. Other components earlier described in FIG. 1C that interact with the instances of the replication configurator can also be implemented in the environment 200.

As earlier described, various selection techniques to facilitate selection of an availability domain aware replication configuration can be implemented according to the herein disclosed techniques. One embodiment of a selection technique is shown and described as pertains to FIG. 3A.

Figure 3A:
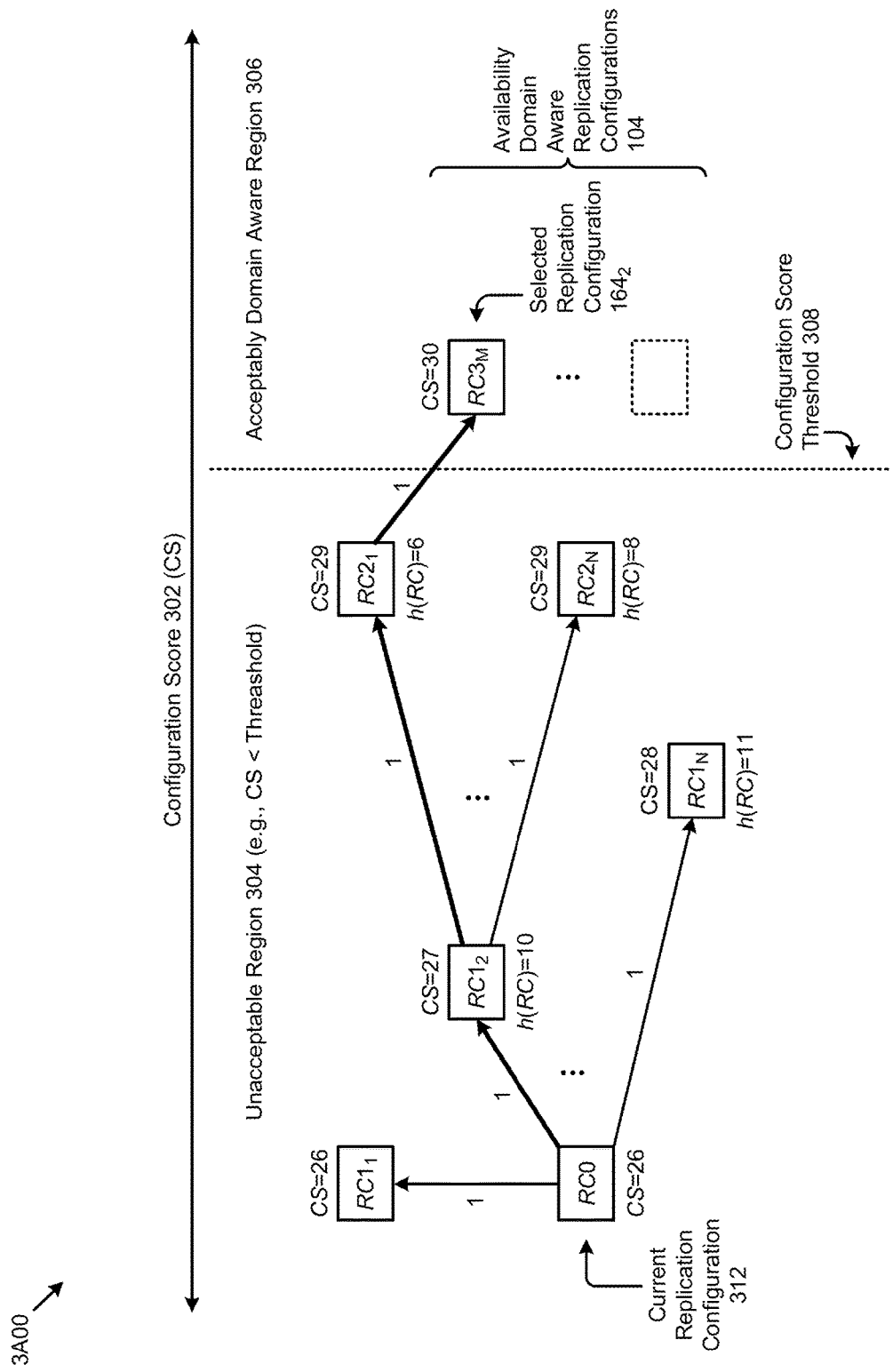
FIG. 3A presents a heuristics-based informed search technique as implemented in systems for efficiently implementing availability domain aware replication policies in distributed storage platforms, according to an embodiment.

FIG. 3A presents a heuristics-based informed search technique 3A00 as implemented in systems for efficiently implementing availability domain aware replication policies in distributed storage platforms. As an option, one or more variations of heuristics-based informed search technique 3A00 or any aspect thereof may be implemented in the context of the architecture and functionality of the embodiments described herein. The heuristics-based informed search technique 3A00 or any aspect thereof may be implemented in any environment.

The heuristics-based informed search technique 3A00 shown in FIG. 3A represents one embodiment of a technique for selecting an availability domain aware replication configuration. Specifically, the heuristics-based informed search technique 3A00 can graphically represent the implementation of an A* search algorithm with a heuristic function that operates on a given replication configuration (e.g., h(RC)). The framework for this graphical representation comprises a range associated with a configuration score 302 divided into an unacceptable configuration region 304 that includes various replication configurations with configuration scores less than configuration score threshold 308 (e.g., CST), and an acceptably domain aware region 306 that includes various replication configurations with configuration scores greater than or equal to the CST. For the scenario shown in FIG. 3A, a ring structure comprising 15 ring nodes (e.g., N=15) with a replication factor of three (e.g., RF=3) is considered. In this case, according to EQ. 1, CST is 30. As shown, a current replication configuration 312 (e.g., RC0) might have a configuration score of 26 (e.g., CS=26). Since CS is less than CST, RC0 is in the unacceptable configuration region 304, which can precipitate the selection of an availability domain aware replication configuration. Specifically, the heuristics-based informed search technique 3A00 can be implemented to efficiently and optimally select one of the one or more possible instances of availability domain aware replication configurations 104.

More specifically, the heuristics-based informed search technique 3A00 can implement at least in part an A* search algorithm to search all paths from RC0 to one of the availability domain aware replication configurations 104 to determine the path corresponding to the lowest cost. For the implementation described herein, such costs might be associated with a number of changed ring node positions, a number of computations associated with the generation of the neighboring replication configurations, and/or other metrics. In some cases, the heuristics-based informed search technique 3A00 might consider paths that can most quickly reach the goal in each iteration of the algorithm so as to, at least in part, facilitate an optimal search result. For example, a set of neighboring replication configurations comprising merely one changed ring node position as compared to current replication configuration 312 might be considered in each search iteration. Such "one-move" configurations in iteration "1" are represented in FIG. 3A as $RC1_1$ (with CS=26), $RC1_2$ (with CS=27), and $RC1_N$ (with CS=29). The "one-move" attribute of the neighboring replication configurations can be indicated by a weighting of "1" on the edge (e.g., partial path) connecting the neighboring replication configuration to RC0.

The heuristics-based informed search technique 3A00 can determine which of the available paths to take towards the goal based at least in part on a heuristic function and/or other metrics. Specifically, the heuristics-based informed search technique 3A00 might associate an efficiency metric with each of the partial paths based at least in part on the configuration score of the respective neighboring replication configuration. For example, $RC1_1$ might have a CS of 26, which is below the CS of $RC1_2$ and $RC1_N$ (e.g., 27 and 28, respectively). In this case, the partial path through $RC1_1$ might be excluded as an inefficient path to the goal. A selected partial path from the remaining partial paths can be determined based at least in part on an estimate of the remaining cost to reach the goal from a particular selected partial path. In some cases, the remaining cost can be referred to as a transition score. According to the herein disclosed techniques, a heuristic function can be used to indicate the transition score. Specifically, in some embodiments, the heuristic function for a given replication configuration (RC) implemented herein can be represented as shown in EQ. 2 below.

$$h(RC)=(CST-CS)+(N-MCN) \quad \text{(EQ. 2)}$$

Referring again to FIG. 3A, the transition score of $RC1_2$ (e.g., h(RC)=10) is less than the transition score of $RC1_N$ (e.g., h(RC)=11). In this case, the partial path to $RC1_2$ will be selected by the algorithm. A second iteration (e.g., iteration "2") of the algorithm produces partial paths to $RC2_1$ through $RC2_N$. Applying the foregoing techniques, the partial path to $RC2_1$ can be selected. Since $RC2_1$ is in the unacceptable configuration region 304, more iterations can be executed. A third iteration (e.g., iteration "3") produces a neighboring replication configuration $RC3_M$ that exhibits a configuration score equal to configuration score threshold 308 (e.g., CS=30). As such, $RC3_M$ can be selected as the selected replication configuration 1642.

The heuristic function specified in EQ. 2 can be characterized as a non-admissible heuristic function. Such non-admissible heuristic functions may not provide an optimal solution, however such non-admissible heuristic functions can be implemented for its efficiency aspects pertaining to ring structures with a large number of ring nodes. In some cases, the shortest path to the goal might be discovered when the heuristic function is characterized as admissible. Such admissible heuristic functions can underestimate the actual cost to reach a particular goal. An admissible heuristic function might be implemented for ring structures with a low number of ring nodes. An example of an admissible heuristic function that can be implemented using the herein disclosed techniques is shown in EQ. 3.

$$h(RC)=(CST-CS)/(2+3\cdot(RF-1)) \quad \text{(EQ. 3)}$$

The shown EQ.3 is merely one example of an admissible heuristic function. Other admissible functions that evaluate to under-estimates of the number of remaining moves needed to achieve a block aware configuration can be used. Various applications of such admissible heuristic functions serve to optimize the number of moves that would in turn serve to minimize the impact to the ring configuration and to minimize the cost to achieve block awareness. Strictly as one possible application, a heuristic function might calculate a set of maximum improvement scores achieved by respective moves and then estimate the number of remaining moves by dividing the difference in the calculated scores by the maximum improvement. This approach renders a conservative approximation of the minimum number of moves to reach a block aware configuration. As such, this approach yields an underestimation of the actual cost (e.g., moves to undertake) in order to reach the goal of a block aware configuration. Such an approach (e.g., using an admissible function) can be used in many possible flows for selecting replication configurations. One embodiment of a flow for selecting an availability domain aware replication configuration according to the herein disclosed techniques is shown and described as pertains to FIG. 3B.

Figure 3B:
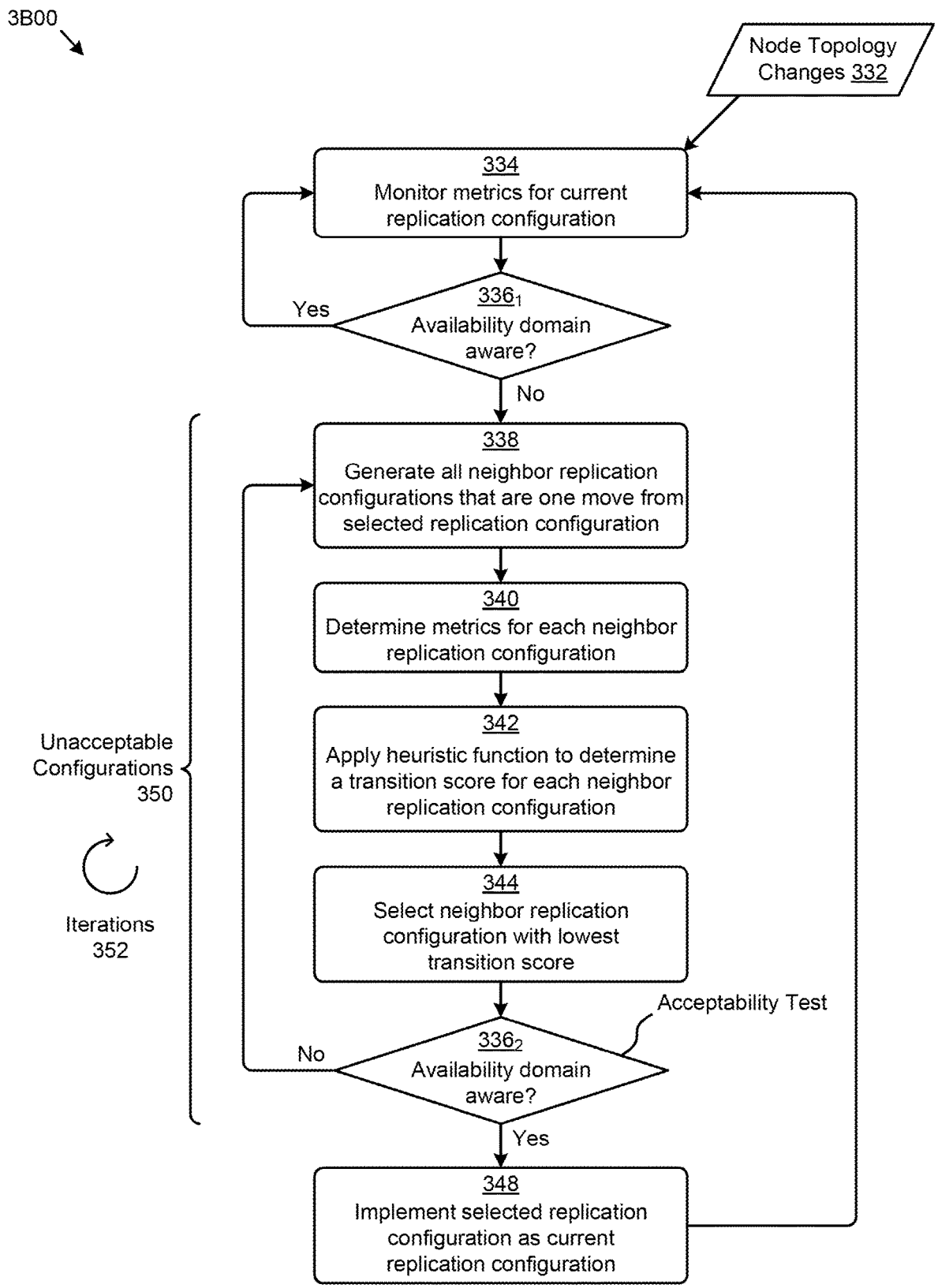
FIG. 3B presents a replication configuration selection flow technique as implemented in systems for efficiently implementing availability domain aware replication policies in distributed storage platforms, according to an embodiment.

FIG. 3B presents a replication configuration selection flow technique 3B00 as implemented in systems for efficiently implementing availability domain aware replication policies in distributed storage platforms. As an option, one or more variations of replication configuration selection flow technique 3B00 or any aspect thereof may be implemented in the context of the architecture and functionality of the embodiments described herein. The replication configuration selection flow technique 3B00 or any aspect thereof may be implemented in any environment.

The replication configuration selection flow technique 3B00 presents one embodiment of certain steps and/or operations for facilitating replication configuration selection when efficiently implementing availability domain aware replication policies in distributed storage platforms according to the herein disclosed techniques. In one or more embodiments, the steps and underlying operations comprising the replication configuration selection flow technique 3B00 can be executed by an instance of replication configurator $120_1$ as shown and described in FIG. 1C and herein. As shown, the replication configuration selection flow technique 3B00 can monitor various metrics pertaining to the then-current replication configuration (at step 334). For example, the CS of the then-current replication configuration might indicate the replication configuration is availability domain aware (see "Yes" path of decision $336_1$). In some cases, certain instances of node topology changes 332 can precipitate a change to the then-current replication configuration such that it is availability domain unaware (see "No" path of decision $336_1$).

In this case, the then-current replication configuration can be identified as the selected replication configuration and the replication configuration selection flow technique 3B00 can enter a group of steps and underlying operations that will loop through one or more iterations (e.g., iterations 352) while the considered replication configurations are unacceptable (see grouping 350). Specifically, in certain embodiments, a set of neighbor replication configurations that are one move from the selected replication configuration can be generated (at step 338). Metrics (e.g., partial path weights, configuration scores, etc.) for each of the neighbor replication configurations can be determined (at step 340). In some cases, certain neighbor replication configurations might be excluded based at least in part on the metrics. For example, the neighbor replication configurations with the lowest configuration scores might be excluded. Using the foregoing metrics and/or other information, a heuristic function can be applied to each of the neighbor replication configurations to determine a transition score (at step 342). The neighbor replication configuration with the lowest transition score can be selected as the selected replication configuration (at step 344). If the selected replication configuration is availability domain unaware (see "No" path of decision $336_2$), the loop will repeat in another iteration. If the selected replication configuration is availability domain aware (see "Yes" path of decision $336_2$), the selected replication configuration can be implemented (e.g., by a replication service) as the then-current replication configuration (at step 348).

Additional Embodiments of the Disclosure

Additional Practical Application Examples

Figure 4A:
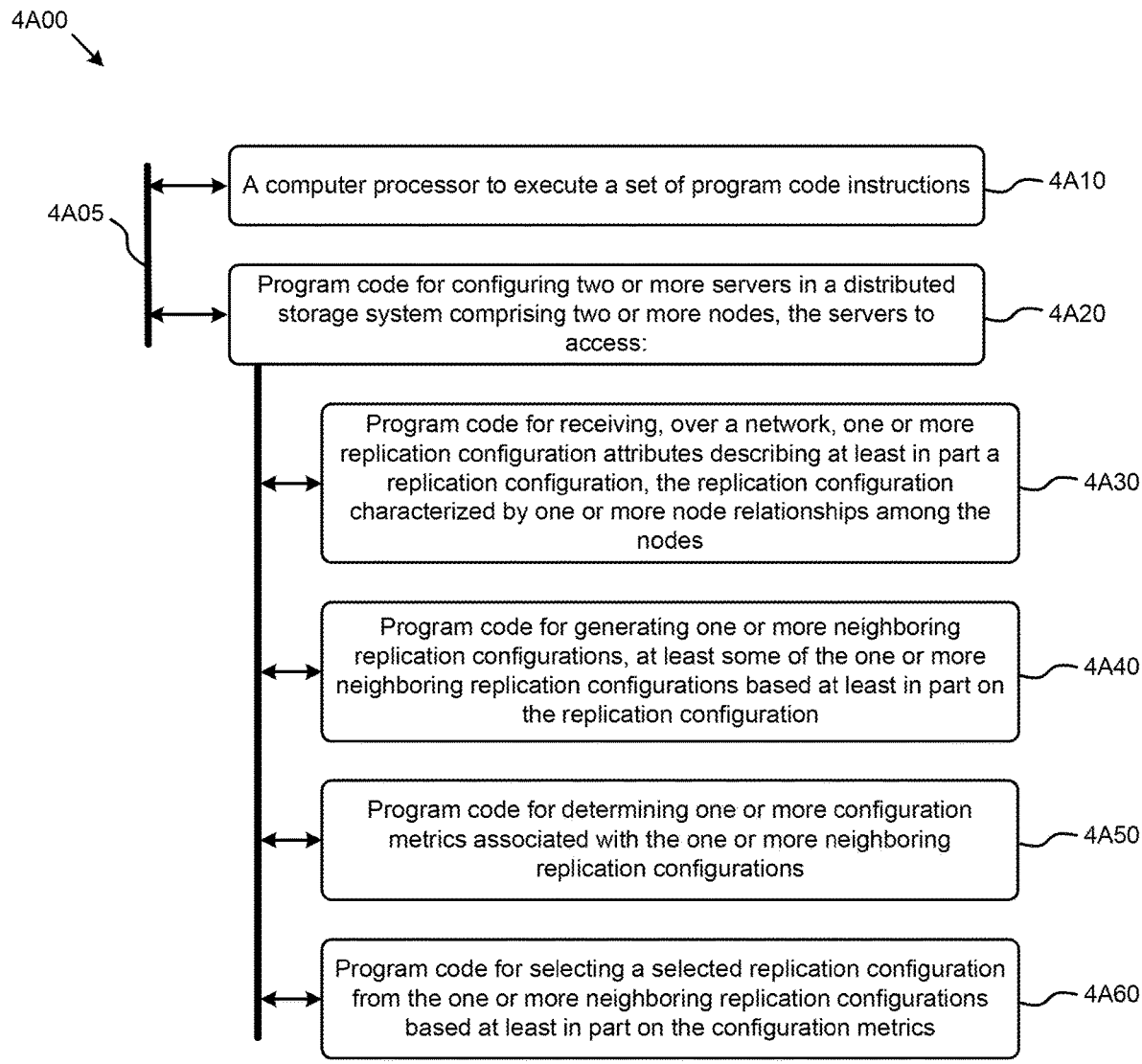
FIG. 4A and FIG. 4B depict system components as arrangements of computing modules that are interconnected so as to implement certain of the herein-disclosed embodiments.

FIG. 4A depicts a system 4A00 as an arrangement of computing modules that are interconnected so as to operate cooperatively to implement certain of the herein-disclosed embodiments. The partitioning of system 4A00 is merely illustrative and other partitions are possible. As an option, the system 4A00 may be implemented in the context of the architecture and functionality of the embodiments described herein. Of course, however, the system 4A00 or any operation therein may be carried out in any desired environment.

The system 4A00 comprises at least one processor and at least one memory, the memory serving to store program instructions corresponding to the operations of the system. As shown, an operation can be implemented in whole or in part using program instructions accessible by a module. The modules are connected to a communication path 4A05, and any operation can communicate with other operations over communication path 4A05. The modules of the system can, individually or in combination, perform method operations within system 4A00. Any operations performed within system 4A00 may be performed in any order unless as may be specified in the claims.

The shown embodiment implements a portion of a computer system, presented as system 4A00, comprising a computer processor to execute a set of program code instructions (module 4A10) and modules for accessing memory to hold program code instructions to perform: configuring two or more servers in a distributed storage system comprising two or more nodes, the servers to perform operations (module 4A20) comprising: receiving, over a network, one or more replication configuration attributes describing at least in part a replication configuration, the replication configuration characterized by one or more node relationships among the nodes (module 4A30); generating one or more neighboring replication configurations, at least some of the one or more neighboring replication configurations based at least in part on the existing replication configuration (module 4A40); determining one or more configuration metrics associated with the one or more neighboring replication configurations (module 4A50); and selecting a selected replication configuration from the one or more neighboring replication configurations based at least in part on the configuration metrics (module 4A60).

Variations of the foregoing may include more or fewer of the shown modules and variations may perform more or fewer (or different) steps, and/or may use data elements in more, or in fewer or different operations.

Some embodiments include variations comprising steps for receiving, over a network, one or more node topology attributes describing at least in part one or more availability domains in the distributed storage system, the availability domains associated with a respective portion of the nodes, and the selected replication configuration is selected based at least in part on the availability domains.

Some embodiments include variations where the acts of receiving at least one of the replication configuration attributes, or the node topology attributes, is responsive to one or more node topology changes.

Some embodiments include variations where the node topology attributes comprise at least one of, a node identifier, an availability domain identifier, a site identifier, a host identifier, an IP address, or a node state.

Some embodiments include variations where at least one of, the replication configuration, one or more neighboring replication configurations, or the selected replication configuration, comprise a ring structure.

Some embodiments include variations where at least two of, the replication configuration, one or more neighboring replication configurations, or the selected replication configuration, differ by at least one changed node position.

Some embodiments include variations where the ring nodes of the selected replication configuration associated with an availability domain are separated in the ring structure by a number of ring nodes equal to a replication factor minus one.

Some embodiments include variations where the configuration metrics are based at least in part on at least one of, a replication factor, a configuration score, a node score, a maximum consecutive node score, a transition score, a block aware score, a rack aware score, or a heuristic function.

Some embodiments include variations where the heuristic function is at least one of, an admissible heuristic function, or a non-admissible heuristic function.

Some embodiments include variations where the selected replication configuration is selected based at least in part on an informed search algorithm.

Some embodiments include variations where the informed search algorithm comprises at least one of, an A* search algorithm, a breadth first search algorithm, a best first search algorithm, a greedy approach, or a pruning technique.

Some embodiments include variations where the replication configuration attributes comprise at least one of, a node identifier, a token identifier, an IP address, a data center, a rack identifier, a predecessor node identifier, or a successor node identifier.

Some embodiments include variations where the attributes describe at least in part a replication configuration, the replication configuration characterized by one or more node relationships among the nodes.

Some embodiments include variations further comprising steps for accessing one or more servers in a distributed storage system comprising one or more nodes.

Some embodiments include variations further comprising steps generating one or more neighboring replication configurations, at least some of the one or more neighboring replication configurations based at least in part on the replication configuration.

Some embodiments include variations further comprising steps determining one or more configuration metrics associated with the one or more neighboring replication configurations.

Some embodiments include variations further comprising steps selecting a selected replication configuration from the one or more neighboring replication configurations based at least in part on the configuration metrics.

Figure 4B:
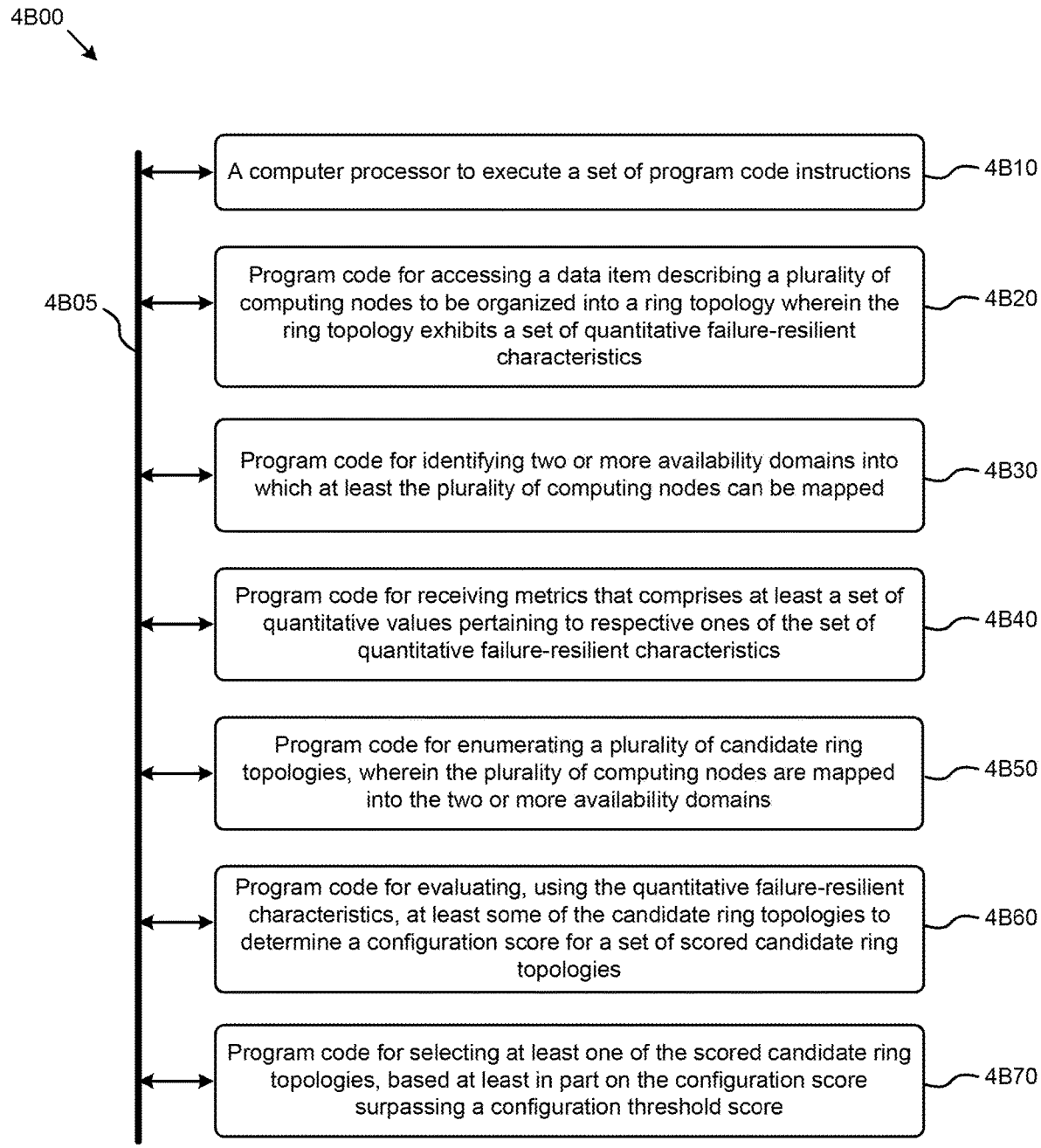

FIG. 4B depicts a system 4B00 as an arrangement of computing modules that are interconnected so as to operate cooperatively to implement certain of the herein-disclosed embodiments. The partitioning of system 4B00 is merely illustrative and other partitions are possible. As an option, the system 4B00 may be implemented in the context of the architecture and functionality of the embodiments described herein. Of course, however, the system 4B00 or any operation therein may be carried out in any desired environment. The system 4B00 comprises at least one processor and at least one memory, the memory serving to store program instructions corresponding to the operations of the system. As shown, an operation can be implemented in whole or in part using program instructions accessible by a module. The modules are connected to a communication path 4B05, and any operation can communicate with other operations over communication path 4B05. The modules of the system can, individually or in combination, perform method operations within system 4B00. Any operations performed within system 4B00 may be performed in any order unless as may be specified in the claims. The shown embodiment implements a portion of a computer system, presented as system 4B00, comprising a computer processor to execute a set of program code instructions (module 4B10) and modules for accessing memory to hold program code instructions to perform: accessing a data item describing a plurality of computing nodes to be organized into a ring topology wherein the ring topology exhibits a set of quantitative failure-resilient characteristics (module 4B20); identifying two or more availability domains into which at least the plurality of computing nodes can be mapped (module 4B30); receiving metrics that comprises at least a set of quantitative values pertaining to respective ones of the set of quantitative failure-resilient characteristics (module 4B40); enumerating a plurality of candidate ring topologies, wherein the plurality of computing nodes are mapped into the two or more availability domains (module 4B50); evaluating, using the quantitative failure-resilient characteristics, at least some of the candidate ring topologies to determine a configuration score for a set of scored candidate ring topologies (module 4B60); and selecting at least one of the scored candidate ring topologies, based at least in part on the configuration score surpassing (e.g., being equal or greater than) a configuration threshold score (module 4B70).

System Architecture Overview

Additional System Architecture Examples

Figure 5A:
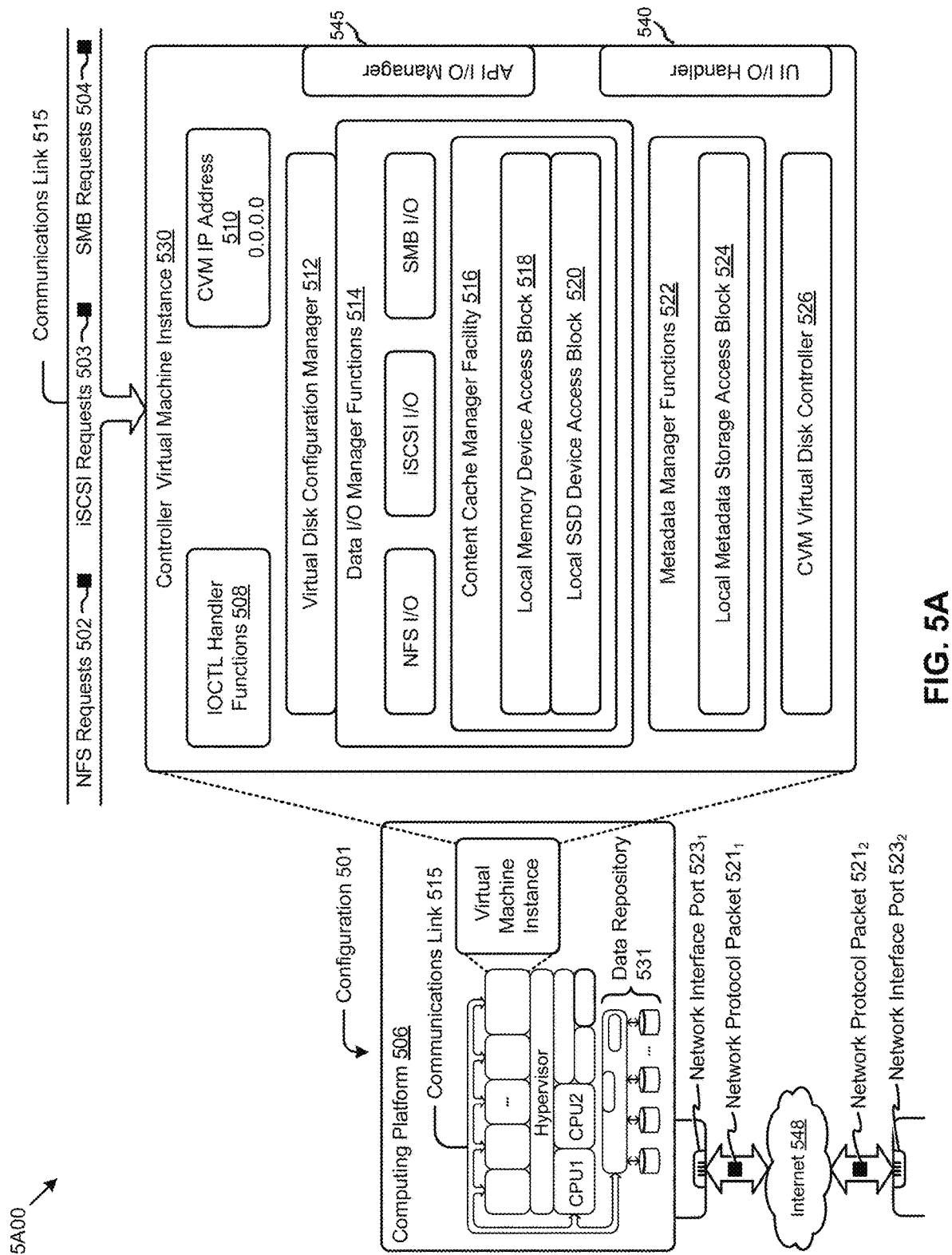
FIG. 5A and FIG. 5B depict architectures comprising collections of interconnected components suitable for implementing embodiments of the present disclosure and/or for use in the herein-described environments.

FIG. 5A depicts a virtualized controller as implemented by the shown virtual machine architecture 5A00. The virtual machine architecture comprises a collection of interconnected components suitable for implementing embodiments of the present disclosure and/or for use in the herein-described environments. Moreover, the shown virtual machine architecture 5A00 includes a virtual machine instance in a configuration 501 that is further described as pertaining to the controller virtual machine instance 530. A controller virtual machine instance receives block I/O (input/output or IO) storage requests as network file system (NFS) requests in the form of NFS requests 502, and/or internet small computer storage interface (iSCSI) block IO requests in the form of iSCSI requests 503, and/or Samba file system (SMB) requests in the form of SMB requests 504. The controller virtual machine (CVM) instance publishes and responds to an internet protocol (IP) address (e.g., see CVM IP address 510). Various forms of input and output (I/O or IO) can be handled by one or more IO control handler functions (see IOCTL functions 508) that interface to other functions such as data IO manager functions 514 and/or metadata manager functions 522. As shown, the data IO manager functions can include communication with a virtual disk configuration manager 512 and/or can include direct or indirect communication with any of various block IO functions (e.g., NFS IO, iSCSI IO, SMB IO, etc.).

In addition to block IO functions, the configuration 501 supports IO of any form (e.g., block IO, streaming IO, packet-based IO, HTTP traffic, etc.) through either or both of a user interface (UI) handler such as UI IO handler 540 and/or through any of a range of application programming interfaces (APIs), possibly through the shown API IO manager 545.

The communications link 515 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 530 includes a content cache manager facility 516 that accesses storage locations, possibly including local dynamic random access memory (DRAM) (e.g., through the local memory device access block 518) and/or possibly including accesses to local solid state storage (e.g., through local SSD device access block 520).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 531, which in turn can be formatted into any one or more storage areas, and which can comprise parameterized storage accessible by a key (e.g., a filename, a table name, a block address, an offset address, etc.). An external data repository 531 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 524. The external data repository 531 can be configured using a CVM virtual disk controller 526, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of a configuration 501 can be coupled by a communications link 515 (e.g., backplane, LAN, PTSN, wired or wireless network, etc.) and each instance may perform respective portions of sequences of instructions as may be required to practice embodiments of the disclosure.

The shown computing platform 506 is interconnected to the Internet 548 through one or more network interface ports (e.g., network interface port 523$_1$ and network interface port 523$_2$). The configuration 501 can be addressed through one or more network interface ports using an IP address. Any operational element within computing platform 506 can perform sending and receiving operations using any of a range of network protocols, possibly including network protocols that send and receive packets (e.g., see network protocol packet 521$_1$ and network protocol packet 521$_2$).

The computing platform 506 may transmit and receive messages that can be composed of configuration data, and/or any other forms of data and/or instructions organized into a data structure (e.g., communications packets). In some cases, the data structure includes program code instructions (e.g., application code) communicated through Internet 548 and/or through any one or more instances of communications link 515. Received program code may be processed and/or executed by a CPU as it is received and/or program code may be stored in any volatile or non-volatile storage for later execution. Program code can be transmitted via an upload (e.g., an upload from an access device over the Internet 548 to computing platform 506). Further, program code and/or results of executing program code can be delivered to a particular user via a download (e.g., a download from the computing platform 506 over the Internet 548 to an access device).

The configuration 501 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics when observing availability domain aware replication policies.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate observance of availability domain aware replication policies). Such files or records can be brought into and/or stored in volatile or non-volatile memory.

Figure 5B:
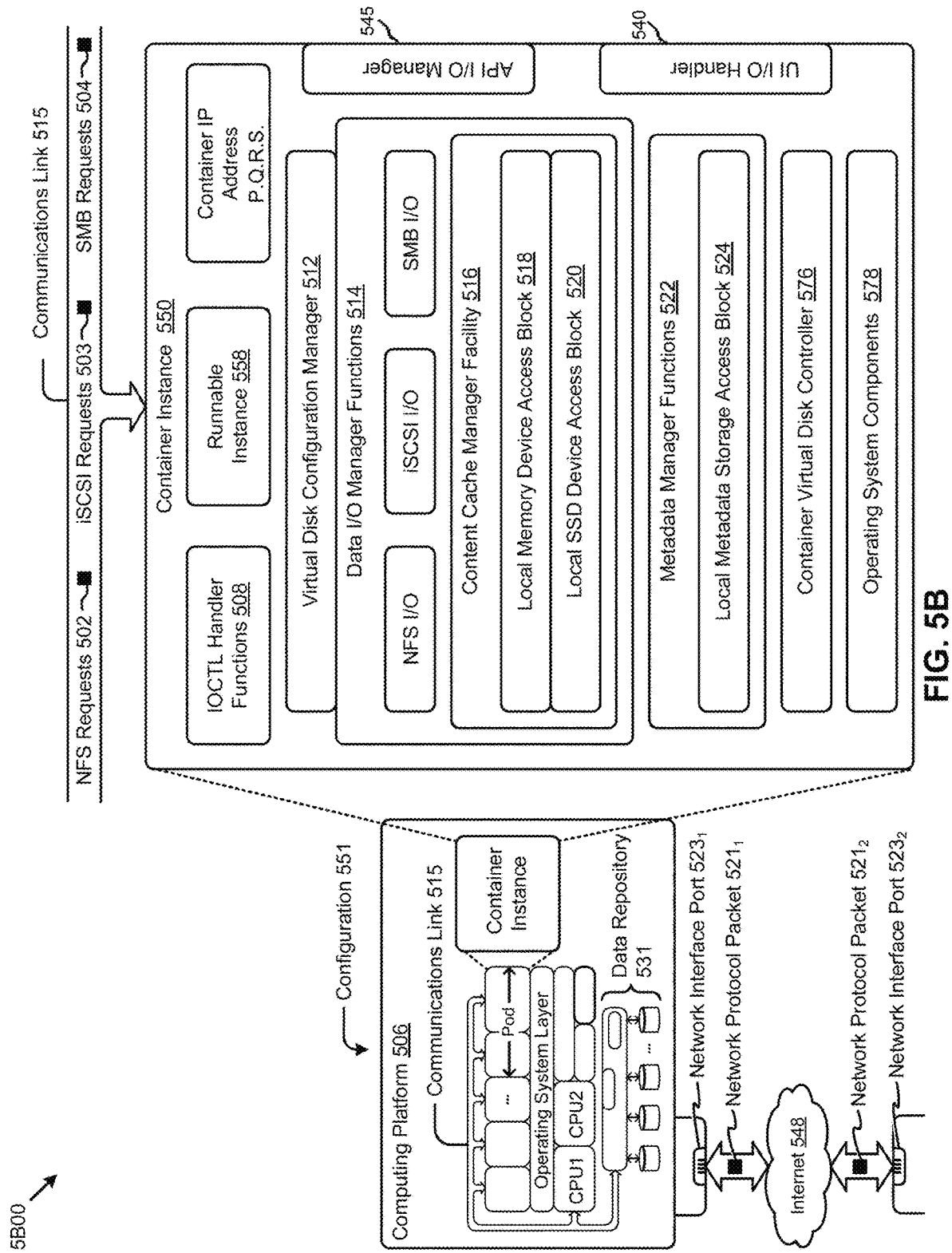

FIG. 5B depicts a virtualized controller implemented by a containerized architecture 5B00. The containerized architecture comprises a collection of interconnected components suitable for implementing embodiments of the present disclosure and/or for use in the herein-described environments. Moreover, the shown containerized architecture 5B00 includes a container instance in a configuration 551 that is further described as pertaining to the container instance 550. The configuration 551 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 550). A container instance can be executed by a processor. Runnable portions of a container instance sometimes derive from a container image, which in turn might include all, or portions of any of, a Java archive repository (JAR) and/or its contents, a script or scripts and/or a directory of scripts, a virtual machine configuration, and may include any dependencies therefrom. In some cases a virtual machine configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container (e.g., a Docker container) can be rooted in a directory system, and can be accessed by file system commands (e.g., "ls" or "ls-a", etc.). The container might optionally include operating system components 578, however such a separate set of operating system components need not be provided. Instead, a container can include a runnable instance 558, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 576. Such a container virtual disk controller can perform any of the functions that the aforementioned CVM virtual disk controller 526 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a set of instructions which, when stored in memory and executed by a distributed storage system, causes virtual machines in the distributed storage system to perform a set of acts to replicate data, the set of acts comprise:
   operating a virtual machine on a computing node of a set of computing nodes in a virtualization system, the virtual machine managing both addition of computing nodes into a ring and replication of data using the computing nodes in the ring; and
   implementing the replication of data using the ring, wherein the ring comprises at least:
      a first virtual machine on a first computing node of the set of computing nodes, the first virtual machine is in a first availability domain, and the first virtual machine causes storage of a first portion of replicas of data, and
      a second virtual machine on a second computing node of the set of computing nodes, the second virtual machine is in a second availability domain, and the second virtual machine causes storage of a second portion of replicas of data.

2. The non-transitory computer readable medium of claim 1, wherein the ring further comprises a third virtual machine on a third computing node of the set of computing nodes, the third virtual machine is in a third availability domain, and the third virtual machine causes storage of a third portion of replicas of data.

3. The non-transitory computer readable medium of claim 2, wherein the third virtual machine on the third computing node was added to the ring to replace a failed virtual machine on a failed computing node.

4. The non-transitory computer readable medium of claim 2, wherein the third virtual machine on the third computing node was added to the ring in response to a topology or configuration change, and the third virtual machine on the third computing node was added to the ring by the virtual machine.

5. The non-transitory computer readable medium of claim 2, wherein the first portion of replicas replicate data stored in a first different availability domain, the second portion of replicas replicate data stored in a second different availability domain, and the third portion of replicas replicate data stored in a third different availability domain.

6. The non-transitory computer readable medium of claim 1, wherein the virtual machine and the first virtual machine are the same virtual machine.

7. The non-transitory computer readable medium of claim 1, wherein the ring further comprises at least two virtual machines on two different computing nodes in the first availability domain and at least two other virtual machines on two other different computing nodes in the second availability domain.

8. The non-transitory computer readable medium of claim 1, wherein an availability domain is specified for each computing node in the ring based on at least an availability domain identifier.

9. A method for using virtual machines in a distributed storage system to perform a set of acts to replicate data, the set of acts comprising:
   operating a virtual machine on a computing node of a set of computing nodes in a virtualization system, the virtual machine managing both addition of nodes into a ring and replication of data using the computing nodes in the ring; and
   implementing the replication of data using the ring, wherein the ring comprises at least:
      a first virtual machine on a first computing node of the set of computing nodes, the first virtual machine is in a first availability domain, and the first virtual machine causes storage of a first portion of replicas of data, and
      a second virtual machine on a second computing node of the set of computing nodes, the second virtual machine is in a second availability domain, and the second virtual machine causes storage of a second portion of replicas of data.

10. The method of claim 9, wherein the ring further comprises a third virtual machine on a third computing node of the set of computing nodes, the third virtual machine is in a third availability domain, and the third virtual machine causes storage of a third portion of replicas of data.

11. The method of claim 10, wherein the third virtual machine on the third computing node was added to the ring to replace a failed virtual machine on a failed computing node.

12. The method of claim 10, wherein the third virtual machine on the third computing node was added to the ring in response to a topology or configuration change, and the third virtual machine on the third computing node was added to the ring by the virtual machine.

13. The method of claim 10, wherein the first portion of replicas replicate data stored in a first different availability domain, the second portion of replicas replicate data stored in a second different availability domain, and the third portion of replicas replicate data stored in a third different availability domain.

14. The method of claim 9, wherein the virtual machine and the first virtual machine are the same virtual machine.

15. The method of claim 9, wherein the ring further comprises at least two virtual machines on two different computing nodes in the first availability domain and at least two other virtual machines on two other different computing nodes in the second availability domain.

16. The method of claim 9, wherein an availability domain is specified for each computing node in the ring based on at least an availability domain identifier.

17. A system comprising:

a distributed storage system; and a non-transitory storage medium having stored thereon a sequence of instructions which, when executed by the distributed storage system, causes virtual machines in the distributed storage system to perform a set of acts to replicate data, the set of acts comprising:

operating a virtual machine on a computing node of a set of computing nodes in a virtualization system, the virtual machine managing both addition of nodes into a ring and replication of data using the computing nodes in the ring; and implementing the replication of data using the ring, wherein the ring comprises at least:

a first virtual machine on a first computing node of the set of computing nodes, the first virtual machine is in a first availability domain, and the first virtual machine causes storage of a first portion of replicas of data, and a second virtual machine on a second computing node of the set of computing nodes, the second virtual machine is in a second availability domain, and the second virtual machine causes storage of a second portion of replicas of data.

18. The system of claim 17, wherein the ring further comprises a third virtual machine on a third computing node of the set of computing nodes, the third virtual machine is in a third availability domain, and the third virtual machine causes storage of a third portion of replicas of data.

19. The system of claim 18, wherein the third virtual machine on the third computing node was added to the ring to replace a failed virtual machine on a failed computing node.

20. The system of claim 18, wherein the third virtual machine on the third computing node was added to the ring in response to a topology or configuration change, and the third virtual machine on the third computing node was added to the ring by the virtual machine.

21. The system of claim 18, wherein the first portion of replicas replicate data stored in a first different availability domain, the second portion of replicas replicate data stored in a second different availability domain, and the third portion of replicas replicate data stored in a third different availability domain.

22. The system of claim 17, wherein the virtual machine and the first virtual machine are the same virtual machine.

23. The system of claim 17, wherein the ring further comprises at least two virtual machines on two different computing nodes in the first availability domain and at least two other virtual machines on two other different computing nodes in the second availability domain.

24. The system of claim 17, wherein an availability domain is specified for each computing node in the ring based on at least an availability domain identifier.

* * * * *

UNITED STATES PATENT AND TRADEMARK OFFICE
CERTIFICATE OF CORRECTION

| | | |
|---|---|---|
| PATENT NO. | : 12,099,421 B2 | Page 1 of 1 |
| APPLICATION NO. | : 17/962010 | |
| DATED | : September 24, 2024 | |
| INVENTOR(S) | : Mohammad Mahmood | |

It is certified that error appears in the above-identified patent and that said Letters Patent is hereby corrected as shown below:

On the Title Page

Item (73) Assignee, Please change "Vista IP Law Group, LLP" to --Nutanix, Inc.--.

Signed and Sealed this
Fifteenth Day of April, 2025

Coke Morgan Stewart
*Acting Director of the United States Patent and Trademark Office*